United States Patent [19]

Cohen

[11] 4,210,391

[45] Jul. 1, 1980

[54] MULTIFOCAL ZONE PLATE

[76] Inventor: Allen L. Cohen, 10108 Windsong Ter., Richmond, Va. 23233

[21] Appl. No.: 970,751

[22] Filed: Dec. 18, 1978

Related U.S. Application Data

[63] Continuation-in-part of Ser. No. 833,368, Sep. 14, 1977, Pat. No. 4,162,122.

[51] Int. Cl.² .......................... G02B 3/08; G02B 5/18; G02C 7/04
[52] U.S. Cl. ............................ 351/161; 350/162 ZP; 350/211
[58] Field of Search ....................... 351/160, 161, 168; 350/211, 162 ZP

[56] References Cited

U.S. PATENT DOCUMENTS 3,004,470  10/1961  Ruhle .................................. 350/211

OTHER PUBLICATIONS

Ziegler, J. F., "Fabrication or Correction of Optical Lenses," *IBM Tech. Dis. Bulletin*, vol. 12, No. 10, Mar. 1970, pp. 1573-1575.

*Primary Examiner*—John K. Corbin
*Assistant Examiner*—Scott J. Sugarman

[57] ABSTRACT

A multifocal Fresnel lens construction suitable for use in optical systems with multifocal requirements. It is designed as a multifocal zone plate to allow an annular ring construction that isn't width limited by diffraction aberrations. This is accomplished by modifying the phase separating annular rings of a zone plate, with curved or inclined optical facets of varying refractive indices, which can then function as Fresnel rings corresponding to the different focal powers desired.

15 Claims, 12 Drawing Figures

$r_n \simeq \sqrt{nd\lambda}$

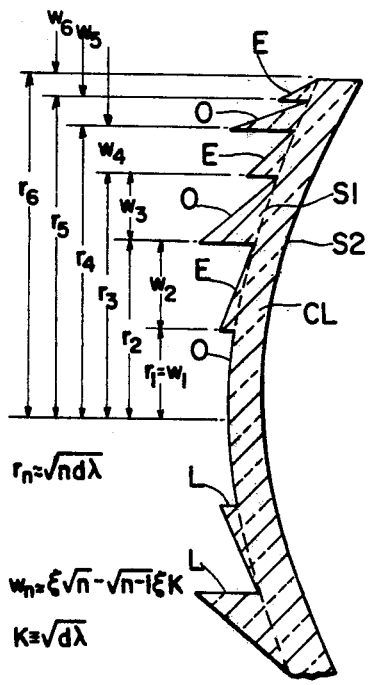
$r_n = \sqrt{nd\lambda}$
$w_n = \xi\sqrt{n} - \sqrt{n-1}\xi K$
$K \equiv \sqrt{d\lambda}$
FIG. 3
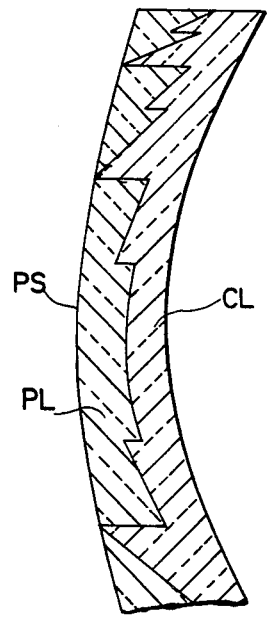
FIG. 4
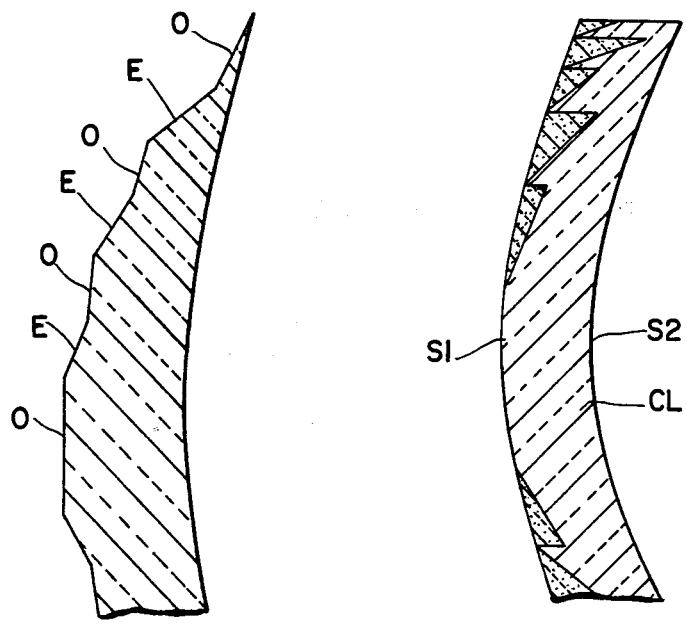
FIG. 5
FIG. 6
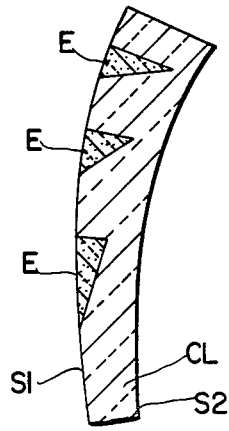
FIG. 7

MULTIFOCAL ZONE PLATE

BACKGROUND OF THE INVENTION

This application is a continuation-in-part of application Ser. No. 833,368 filed Sept. 14, 1977, now U.S. Pat. No. 4,162,122.

This invention releates to multifocal optical devices and, more particularly, to multifocal optical lenses and mirrors, which have their multifocal property distributed approximately throughout said lenses and mirrors.

Multifocal optical lenses, in which the multifocal property is distributed approximately throughout the lens, have been previously produced. Such lenses generally follow the design of Fresnel lenses as described, for example, by H. Rühle in his U.S. Pat. No. 3,004,470. That is, they consist of a plurality of annular rings, the surfaces of which are made part of a carrier lens, and have the same inclinations to the optical axis, in a repetitive interleaving pattern, as the individual surfaces of the separate single focal power lenses that they wish to combine. The widths of the individual zones are not usually specified.

This concept of a multifocal Fresnel lens is illustrated in FIG. 1. Here we see a lens which is divided into concentric annular zones labeled 1-6, each zone presenting an inclined optical facet A. The separate facets may be variously inclined or of differing optical indices, so as to correspond to more than one focal power in order to achieve a multifocal effect. For example, in FIG. 1, it may be that the facets of the even numbered zones are inclined to correspond to a particular focal power, while the facets of the odd numbered zones are inclined to correspond to a specific but different focal power.

Of course multifocal Fresnel mirrors have also been constructed along these same principles.

A major problem inherent in these designs, however, occurs whenever the annular zones have to be constructed with very small widths. In these cases optical aberrations are introduced by diffraction effects. Nevertheless, it is sometimes imperative to design Fresnel lenses with small annular zone widths; such as in contact lenses where the zone widths are limited by the small size of the contact lens itself, or in spectacle lenses where large zonal widths might be cosmetically unacceptable, or in camera lenses where large zonal widths will cause shadows to be cast by the deep non-refractive ledges between adjacent annular zones, or in many other important optical systems.

In the past, optical devices which make use of the well known concept of the zone plate have also been constructed. To understand a zone plate, illustrated in FIG. 2, consider a flat glass plate with a series of concentric circles drawn on its surface such that the radius $r_n$, of the nth circle, is given by $r_n \simeq \sqrt{n\,d\,\lambda}$, where $\lambda$ is the wavelength of light under consideration, d represents a focal length, and $n = 1,2,3,\ldots$. This formulation of $r_n$ is not exact, but represents an excellent approximation, even of the more detailed expressions which account for a curvature of the surface of the glass plate. Now these circles divide the glass plate into annular zones. If these annular zones are numbered consecutively, $1,2,3, \ldots$, from the center zone outward, then the significant property of a zone plate is based on the fact that most incident parallel light, of wavelength $\lambda$, passing through the odd numbered zones will come to focus in phase, at a distance d from the zone plate. Similarly, incident parallel light passing through the even numbered zones, will also come to focus in phase at the distance d from the zone plate. Of course, the light passing through the odd numbered zones, will be out of phase with the light passing through the even numbered zones. Considering the above, "opaque-transparent" zone plates have been constructed to block out light incident upon either the odd or even numbered zones. Also, "phase-shift" zones plates have been constructed, which optically shift the phase of the light incident upon the even (or odd) numbered zones with respect to the odd (or even) numbered zones, so as to bring all of the light focused at d back into phase.

An important property of zone plate devices makes use of the fact that a zone plate has two primary (first order) focal powers, $+1/d$ and $-1/d$. In many situations we can use both of these focal powers. This has been previously demonstrated by Herbert Jefree in his British Pat. No. 802,918.

Still another property of zone plate devices, occurs because diffractive chromatic dispersion is usually opposite to refractive chromatic dispersion. The advantageous use of this phenomenon has been previously demonstrated by A. I. Tudorovskii in his article "An Objective with a Phase Plate," Optics and Spectroscopy, February 1959, where is showed how a zone plate could compensate for the chromatic aberrations inherent in standard optical lenses.

The prior art has also shown composite devices which utilize both Fresnel zone optics and zone plate spacings. But in these cases the Fresnel zones were monofocal. For example, in A. Walsh's Letter to the Editor, J. Opt. Soc. Am., Vol. 42, No. 3, March 1952, a Fresnel mirror with zone plate spacings was disclosed. However, the mirror was not multifocal, and its advantages are at best limited. Other composite devices have been reported by J. G. Hirschberg and P. Platz, Appl. Opt. 4,1375 (1965), and J. G. Hirschberg and F. N. Cooke, Jr., Appl. Opt. 9,2807 (1970). These devices however, are also monofocal in the usual sense of having a single focal plane, although light passing through each annular zone is shifted transversely before being brought to focus in the single focal plane of these devices. These optical elements are disadvantageous for ordinary uses, such as in spectacles or cameras, in that they require multiple sensors.

SUMMARY OF THE INVENTION

In a multifocal lens, we wish to share the incident light between the various focal points, but naturally do not wish to introduce diffraction related aberrations. In a zone plate we make use of diffraction so that it is not an aberration problem, but we must split the incident light into two separate bundles and either block one bundle out, or phase shift it with respect to the other bundle.

The present invention makes use of the fact that both multifocal Fresnel lenses and zone plates, are divided into annular zones which separate incident light according to the zone upon which it is incident. By combining the two distinct entities, that of the multifocal Fresnel lens with that of the zone plate, we eliminate the diffraction problems of the narrow zone multifocal Fresnel lens, while at the same time we separate the two out of phase zone plate bundles of light without blocking out or phase shifting any of the light.

The present invention is summarized in a multiple power optical device, which uses the principle of interleaving annular Fresnel zones of different optical powers, such that the bounding radius $r_n$ of the nth Fresnel zone, is set to substantially approximate the zone plate formula $r_n \simeq \sqrt{nK}$, with K a constant length and $n = 1,2,3,...$, and wherein all of the Fresnel zones of each specific power are bounded on the outside with radii $r_n$, with n always odd, or with n always even.

An important advantage of this invention, is that its performance as a multifocal optical element is not limited by the diffraction aberrations inherent in the usual narrow zone multifocal constructions.

Another advantage of this multifocal zone plate design, is our ability to utilize both of the first order focal powers $+1/d$ and $-1/d$, of the zone plate.

Let us consider for example, the case where we wish to design a bifocal zone plate spectacle lens with two focal powers 0.0D and 2.0D. With reference to FIG. 3, we can design our lens such that $1/d = 0.25D$, $F_o = 0.25D$, and $F_3 = 1.75D$. Then the resulting multifocal zone plate will exhibit in addition to the powers $F_o$ and $F_e$, the four focal powers given by $F_o - 1/d = 0.0D$, $F_o + 1/d = 0.5D$, $F_e - 1/d = 1.5D$, and $F_3 + 1/d = 2.0$ D. As another example of an interesting "bifocal" design, we could choose $1/d = 0.75/D$, $F_o = 0.75D$, and $F_e = 1.5D$. In this case, the additional four focal powers would be $F_o - 1/d = 0.0D$, $F_e - 1/d = 0.75D$, $F_o + 1/d = 1.5D$, and $F_e + 1/d = 2.25D$. Thus by proper design, we can achieve a "multi" multifocal effect. And furthermore, this multiplying effect, of achieving four additional focal powers, occurs without any loss in intensity of the focussed light at the original focal points.

Still another advantage of the present invention, is its ability to correct for chromatic aberrations present in many common optical materials. For example; in hard resin plastic lenses, crown glass optical lenses, and even in the tissues of the human eye, the shorter wavelengths of light are brought to focus at shorter focal lengths than the longer wavelengths of light. The reverse is true for a zone plate based on the formula $r_n \simeq \sqrt{nd\lambda}$, since once the radii $r_n$ are fixed, it is clear that d and λ must vary inversely. Thus it follows that one can often set the absolute size of the multifocal zone plate widths to compensate for chromatic aberration caused by additional lenses in a composite optical system. A particular example, though not necessarily the most important example, would be the design of a multifocal zone plate contact lens, which corrects for the chromatic aberration on as well as the ametropia of the eye. A nominal figure for the chromatic aberration of the eye is given as 1.0 diopters more for λ=486 nm than for λ=656 nm. In this case we can compensate for the chromatic aberration by designing the contact lens with annular zones bounded by radii determined as $r_n \simeq \sqrt{nd\lambda}$, where $d\lambda \simeq 0.17$ mm$^2$, so that the chromatic aberration of the contact lens would be approximately 1.0 diopters less for λ=486 nm than for λ=656 nm. In this example the radius of the first zone is given by $r_1 \simeq 0.41$, and the width of the ninth zone is given by $w_9 = r_9 - r_8 \simeq 0.07$ mm.

In view of the foregoing, it is a primary object of this invention to eliminate most of the diffraction aberrations inherent in the design of narrow zone multifocal Fresnel optical lenses.

It is another object of this invention, to increase the usual number of focal powers in a multifocal optical lens, without reducing the intensity of the light brought to focus at each original focal point.

It is still another object of this invention, to use a multifocal zone plate to compensate for chromatic aberrations which might exist in other associated optical elements.

And it is another object of this invention, to use multifocal zone plate construction as a mirror.

Other objects and advantages of the present invention will be more fully apparent from the following description of the preferred embodiments when taken in conjunction with the accompanying drawings.

BRIEF DESCRIPTION OF THE DRAWINGS

FIG. 3 shows a cross-sectional view of a bifocal zone plate in accordance with the present invention.

FIG. 4 shows a cross-sectional view of a portion of a bifocal zone plate in accordance with one modification of the present invention.

FIG. 5 shows a cross-sectional view of a portion of a bifocal zone plate formed without any ledges in accordance with another modification of the present invention.

FIG. 6 show a cross-sectional view of a portion of a bifocal zone plate formed by ion implentation in accordance with still another modification of the present invention.

FIG. 7 shows a cross-sectional view of a portion of a bifocal zone plate formed by ion implantation into the even zones only in accordance with even another modification of the present invention.

DESCRIPTION OF THE PREFERRED EMBODIMENTS

Figure 1:
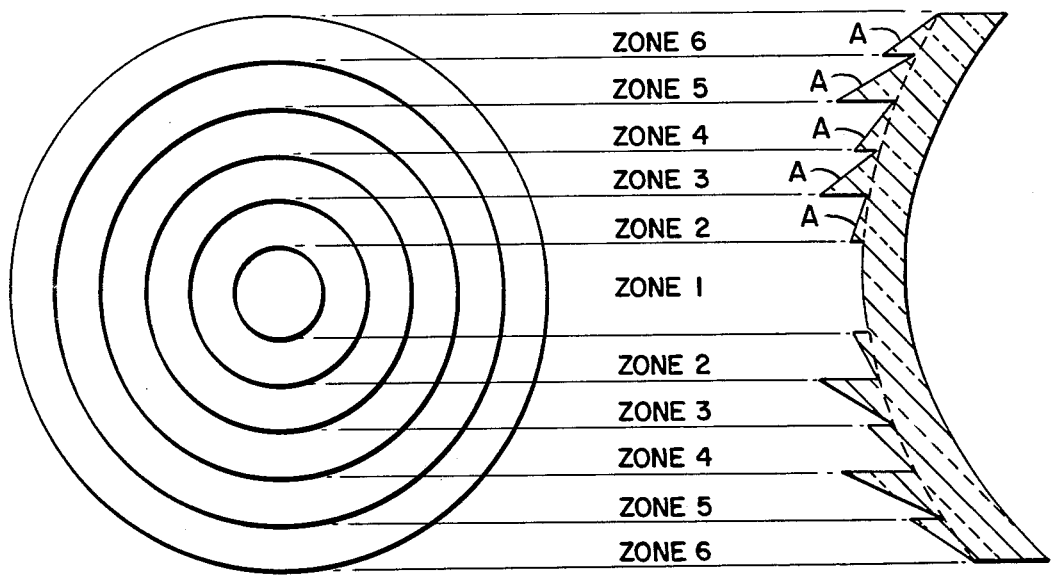
FIG. 1 shows a cross-sectional view of a multifocal Fresnel lens, and its annular zones which are illustrated by concentric circles.
Figure 2:
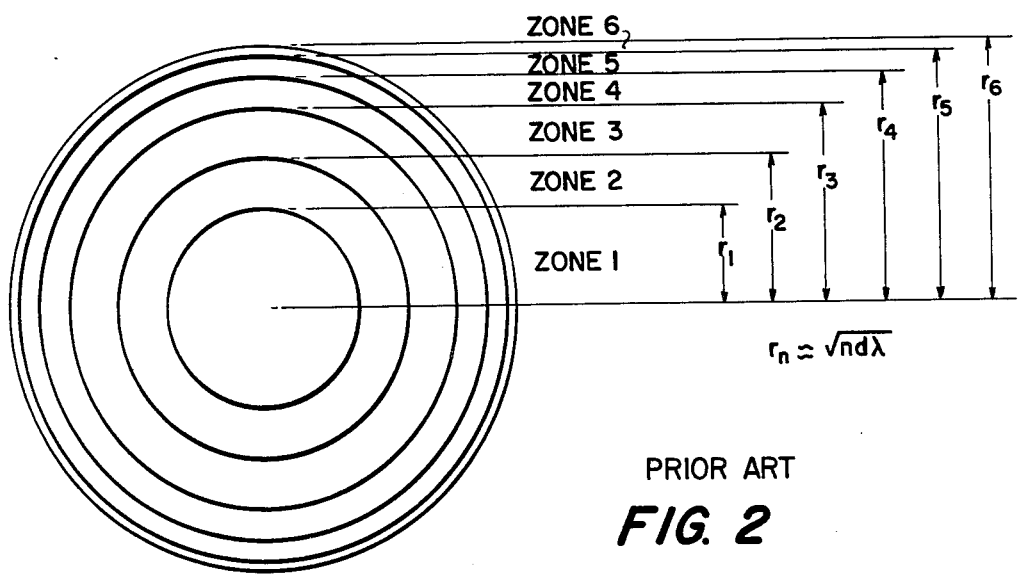
FIG. 2 shows a pattern of concentric circles demarcating the half wave zones of a zone plate.

In the embodiment of the invention as shown in FIG. 3, we have by way of illustration, the anterior surface S1 of a carrier lens or body CL divided into six concentric zones, bounded by radii $r_1-r_6$, in such a manner as to form a "bifocal" zone plate. The carrier lens or body of course, is constructed according to the usual principles governing the design of an optical lens with the surfaces S1 and S2 either spherical, sphero-cylindrical, or of any other appropriate lens design. The spherical, sphero-cylindrical, or aspherical power F of the carrier lens depends, according to the standard lens formulas, on the curvatures of the anterior and posterior surfaces S1 and S2 respectively, the center thickness CT, and the refractive index of the carrier lens. These parameters are in turn, determined by the intended use of the multifocal zone plate and the materials available. For example, the posterior surface S2 may be shaped so as to minimize off axis optical aberrations if the multifocal zone plate is to be used as a spectacle lens. Standard optical materials such as glass, plastic, etc., or any other optically refracting materials may be used in the fabrication of this and all subsequent embodiments.

In this present configuration, a zone is determined as odd if it is bounded on the outside by a radius $r_n$ with n being an odd integer, and even if n is an even integer. The optical facets of the odd zones are labeled O and correspond in inclination to one particular focal power $F_o$, while the optical facets of the even zones are labeled E and correspond to a specific but different focal power $F_e$. While $F_o$ and $F_e$ may be determined arbitrarily, once they are fixed, the inclinations of the facets must be constructed according to the principles of Fresnel zones as discussed by H. Rühle in his U.S. Pat. No. 3,004,470. The adjacent facets are separated by non-refractive ledges L.

The new and important feature of this embodiment, and of all the subsequent embodiments, is the spacing of the Fresnel zones. The radii $r_n$, demarcating the boundaries between the annualr zones are determined by $r_n \simeq \sqrt{nd\lambda}$, where $n=1,2,3,\ldots$, $d\lambda=K$, and K is a constant determined to either compensate for unwanted chromatic aberration, or to locate the four additional powers of the "bifocal" zone plate. It is this relationship of zonal spacings, which eliminates many of the diffraction aberrations which occur in ordinary narrow zone multifocal Fresnel lenses. With the specific value of $r_n$ determined by specifying d, in the "bifocal" zone plate of FIG. 3, we have in addition to the powers $F_o$ and $F_e$, the four focal powers, $F_o+1/d$, $F_o-1/d$, $F_e+1/d$, and $F_e-1/d$.

When we wish to avoid a saw-toothed surface as in the case of a contact lens, or to protect the facets from dirt or damage, we may consider a number of possible modifications as shown in FIGs. 4-6. In FIG. 4, we see one possible modification, as suggested by Hofmann and Weinhold in their Brit. Pat. No. 1,154,360, wherein the multifocal zone plate has its saw-toothed surface imbedded in an optical media PL, which has an index of refraction differing from that of the carrier lens CL, and which can be shaped and polished to a smooth front surface of any desired power. Once again, what is new and novel in this embodiment is the spacing of the annular Fresnel zones. We must still choose the bounding radii $r_n$ to substantially approximate the formula $r_n \simeq \sqrt{nK}$.

And still another possible modification is shown in FIG. 5, where the optical facets of the odd and even zones are interfaced without any non-refractive ledges or steps occuring between adjacent facets. In this case the inclinations of the odd and even facets, designated O and E, respectively are determined in exactly the same manner as in the embodiment of FIG. 3, but the facets are displaced parallel to the optical axis of the lens, such that the bounding edges of adjacent facets coincide, thereby eliminating all of the non-refractive ledges which would normally occur at the boundaries between adjacent Fresnel zones.

Figure 8:
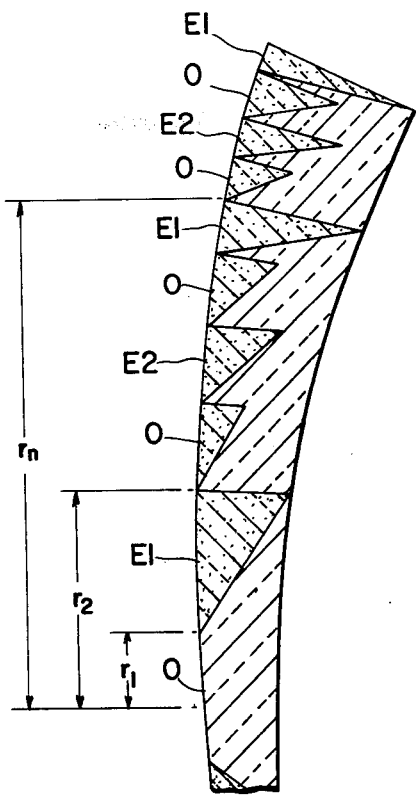
FIG. 8 shows a cross-sectional view of a portion of a trifocal zone plate formed by ion implantation into a carrier lens in accordance with the present invention.

A fabrication method which avoids a sawtoothed surface, is that of ion implentation into a smooth surfaced carrier lens. This procedure is discussed by J. F. Ziegler in his article "Fabrication or Correction of Optical Lenses," IBM Technical Disclosure Bulletin, Vol. 12, No. 10, March 1970, pp. 1573-1575. The Fresnel zones are actually formed by the imbedding of contaminants into the carrier lens or body CL which thereby alters its refractive index. Of course the formation of different zones may require different contaminants. In FIG. 6, we see the cross-section of a bifocal zone plate formed by such a process. As usual, the surfaces S1 and S2 determine the carrier lens or body CL of FIG. 6. The illustrated saw-toothed areas, shown filled in with dots, serve as representations of zones formed by ion implantation. In FIG. 7, we also see a bifocal zone plate which utilizes the ion implantation method of construction. However, in this case, the carrier lens CL is fabricated to have the power $F_o$ by proper design of its surfaces S1 and S2. Now since $F_o$ is the required power for the odd Fresnel zones, in this situation, we only need to implant ions to form the even zones, so as to modify the carrier lens power from $F_o$ to $F_e$ for these even zones. This leads to a simpler construction than that of FIG. 6. Naturally we are not limited to bifocals, but can also consider trifocals, quadrafocals, etc. For example, in FIG. 8 we see an ion implanted "trifocal" zone plate with up to nine useable focal powers. One primary focal power $F_o$, is confined to the odd zones labeled O, while the other two primary powers $F_{e1}$ and $F_{e2}$, are distributed alternately throughout the even zones which are labeled E1 and E2. Again, the zones must be formed by bounding radii $r_n$, where $r_n \simeq \sqrt{nd\lambda}$. And of course, each primary power can yield two additional powers, since a zone plate spacing alters these powers by both $+1/d$ and $-1/d$. The extra six powers in addition to the powers $F_o$, $F_{e1}$, and $F_{e2}$, of this multifocal zone plate are therefore $F_o+1/d$, $F_o-1/d$, $F_{e1}+1/d$, $F_{e1}-1/d$, $F_{e2}+1/d$, and $F_{e2}-1/d$.

Figure 9:
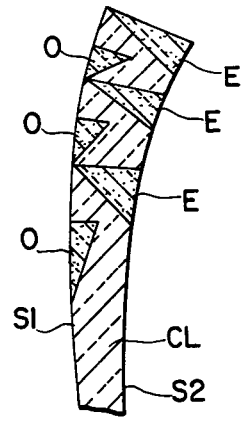
FIGS. 9 and 10 show cross-sectional views of portions of bifocal zone plates utilizing both surfaces of the carrier lens for ion implantation in accordance with modifications of the present invention.
Figure 10:
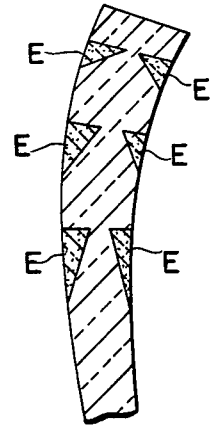

Another embodiment of the present invention, which utilizes ion implantation, is shown in FIG. 9, where the Fresnel zones are formed by ions implanted alternately into the opposite surfaces of the carrier lens, so as to create the odd zones beneath the anterior lens surface S1, and the even zones beneath the posterior lens surface S2. And an interesting variant of this idea combines features of the embodiments of FIGS. 7 and 9, to yield the embodiment of FIG. 10. In this embodiment, we let the carrier lens have the odd zone power $F_o$, as in the embodiment FIG. 7, but make use of both of the lens' surfaces, as in the embodiment of FIG. 9, to form the even zones by ion implantation. This design is useful in those cases where the depth of ion implantation would be a limiting factor in altering the power of the Fresnel zones, by allowing for double the power change achieveable by using one surface alone. It is clear that many other variations can be achieved by combining different features of the embodiments of FIGS. 6,7,8, and 9, to produce a multitude of different multifocal zone plate configurations.

Figure 11:
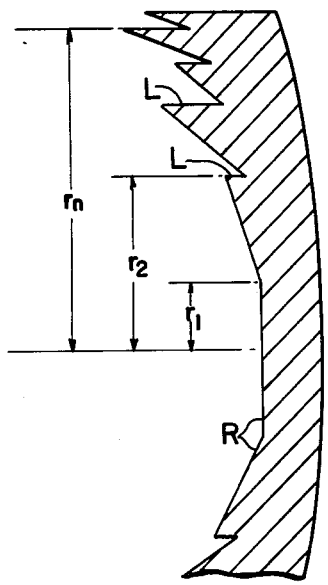
FIG. 11 is a cross-section of a portion of a multifocal zone plate mirror in accordance with the present invention.
Figure 12:
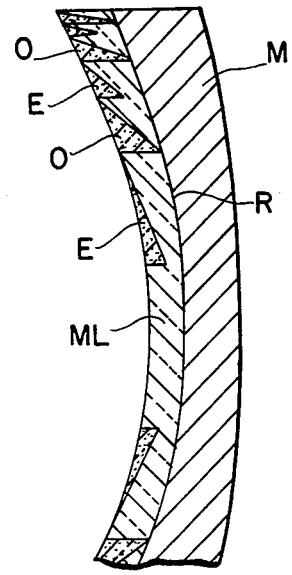
FIG. 12 is a cross-sectional view of a portion of a multifocal zone plate lens-mirror, with the lens formed by ion implantation in accordance with the present invention.

Two additional embodiments of the present invention are mirror body constructions. FIG. 11 shows a multifocal Fresnel zone plate mirror with zone plate spacings. The mirror body is made with a reflecting surface R, and has facets alternating in power between the odd and even zones. Features of the design of the embodiment shown in FIG. 5, can be used to modify the multifocal Fresnel zone mirror of FIG. 11, so as to eliminate all of the non-reflective ledges L on the surface. In FIG. 12 we see a compound lens-mirror system. The mirror M has a reflective surface R, and onto this surface an optically refractive material is deposited to form a lens ML. The Fresnel zones O and E, are then formed in the lens by ion implantation. Again all of the design features illustrated in FIGS. 4–9 are directly applicable, and will produce different and useful embodiments of a multifocal zone plate lens-mirror.

It should be understood, of course, that the foregoing disclosure relates only to the preferred embodiments of the invention, and that numerous modifications or alterations may be made therein, without departing from the spirit and scope of the invention as set forth in the appended claims.

What is claimed as new and desired to be protected by Letters Patent is:

1. A multiple focal power optical device comprising:
   body means having a plurality of alternating odd and even, annular, concentric zones, bounded on the outside of radii $r_n$, with $n = 1,3,5, \ldots$, for the odd zones and $n = 2,4,6, \ldots$, for the even zones;
   first focal power means within at least some of the odd zones for directing incident parallel light to a first focal point;
   second focal power means within at least some of the even zones for directing incident parallel light to a second focal point different from said first focal point;
   wherein the radii $r_n$ of said odd and even zones are substantially proportional to square root of n.

2. The invention of claim 1 wherein said body means comprises an optically refracting material.

3. The invention of claim 2 wherein said first and second focal power means comprise a plurality of discrete refracting elements within their respective annular zones.

4. The invention of claim 3 wherein at least some of said optically refracting elements include contaminants imbedded in said body means to achieve the desired focal powers.

5. The invention of claim 4 wherein the discrete refractive elements of the first focal power means occupy every odd zone, and the discreet refractive elements of the second focal power means occupy every even zone.

6. The invention of claim 1 further including a third focal power means within at least some of the annular zones.

7. The invention of claim 1 wherein the body means is designed to act as an ophthalmic bifocal spectacle lens.

8. The invention of claim 1 wherein the body means is designed to act as an ophthalmic bifocal contact lens.

9. The invention of claim 1 wherein the said body means comprises an optically reflecting material.

10. A multiple power optical device, using the principle of interleaving annular Fresnel zones corresponding to different optical powers, wherein the radius $r_n$, bounding the nth Fresnel zone, is set to substantially approximate the formula $r_n \simeq \sqrt{nK}$, where K is an arbitrary but constant length and $n = 1,2,3, \ldots$, and wherein for each specific power, all of the corresponding Fresnel zones are bounded on the outside by radii $r_n$, with n being either odd for all of the zones or even for all of the zones.

11. A multiple focal length optical lens, according to claim 10, wherein the Fresnel zones are refracting annular rings bounded by radii $r_n$, and for each n, the radius $r_n$ is set to substantially approximate the formula $r_n \simeq \sqrt{nK}$, where K is an arbitrary but constant length and $n = 1,2,3, \ldots$, and wherein for each specific focal length, all of the corresponding Fresnel zones are bounded by an outer radius $r_n$, with n being either odd for all of the zones or even for all of the zones.

12. A multiple focal length optical lens, according to claim 11, wherein only two focal lengths are used, and their corresponding Fresnel zones are presented alternately, so that every zone corresponding to one of the focal lengths is bounded on the outside by a radius $r_n$ with n being odd, and every zone corresponding to the other focal length is bounded on the outside by a radius $r_n$ with n being even.

13. A multiple focal length optical lens, according to claim 12, wherein it is designed to act as an ophthalmic bifocal spectacle lens.

14. A multiple focal length optical lens, according to claim 12, wherein it is designed to act as an ophthalmic bifocal contact lens.

15. A multiple power optical mirror, according to claim 10, wherein the Fresnel zones are reflecting annular rings bounded by radii $r_n$, and for each n, the radius $r_n$ is set to substantially approximate the formula $r_n \simeq \sqrt{nK}$, where K is an arbitrary but constant length and $n = 1,2,3, \ldots$, and wherein for each specific focal length, all of the corresponding Fresnel zones are bounded by an outer radius $r_n$, with n being either odd for all of the zones or even for all of the zones.

* * * * *